(12) United States Patent
Jaeger et al.

(10) Patent No.: US 10,564,924 B1
(45) Date of Patent: Feb. 18, 2020

(54) NAVIGATING METADATA IN LONG FORM CONTENT

(71) Applicant: Amazon Technologies, Inc., Seattle, WA (US)

(72) Inventors: Timothy Jaeger, Metuchen, NJ (US); Trevor Arlen Baum, Brooklyn, NY (US); Jason Paul Fields, Brooklyn, NY (US); Young Suk Im, New Brunswick, NJ (US); Carlos Raul Pasols, Jr., West Orange, NJ (US); David Wayne Reid, Weehawken, NJ (US); Francis Andrew Shanahan, Watchung, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 794 days.

(21) Appl. No.: 14/870,646

(22) Filed: Sep. 30, 2015

(51) Int. Cl.
| | |
|---|---|
| *G06F 3/00* | (2006.01) |
| *G06F 3/16* | (2006.01) |
| *G06F 3/0483* | (2013.01) |
| *G06F 3/0484* | (2013.01) |
| *G06F 16/68* | (2019.01) |
| *G06F 3/0481* | (2013.01) |

(52) U.S. Cl.
CPC ............ *G06F 3/165* (2013.01); *G06F 3/0481* (2013.01); *G06F 3/0483* (2013.01); *G06F 3/04847* (2013.01); *G06F 16/686* (2019.01)

(58) Field of Classification Search
CPC ... G06F 3/0481; G06F 3/0483; G06F 3/04847
See application file for complete search history.

(56) References Cited

U.S. PATENT DOCUMENTS

| | | | | |
|---|---|---|---|---|
| 5,974,386 | A * | 10/1999 | Ejima | G11C 7/16 348/185 |
| 6,292,170 | B1 * | 9/2001 | Chang | G06F 3/011 345/156 |
| 6,532,024 | B1 * | 3/2003 | Everettt | H04N 7/012 345/440 |
| 7,849,406 | B2 * | 12/2010 | Okada | G11B 27/034 386/278 |
| 8,793,575 | B1 * | 7/2014 | Lattyak | G09B 5/062 715/273 |
| 2003/0034997 | A1 * | 2/2003 | McKain | G11B 31/006 715/723 |
| 2005/0066279 | A1 * | 3/2005 | LeBarton | G06T 13/00 715/723 |
| 2007/0250863 | A1 * | 10/2007 | Ferguson | H04H 20/106 725/46 |
| 2011/0047517 | A1 * | 2/2011 | Lee | G06F 3/04883 715/863 |

(Continued)

Primary Examiner — Kieu D Vu
Assistant Examiner — Andrew Chung
(74) Attorney, Agent, or Firm — Lee & Hayes, P.C.

(57) ABSTRACT

Techniques are provided for providing assistance to users in locating and accessing points of interest associated with particular time positions in the media items using the techniques described herein. For instance, an electronic device outputting a media item may select one or more metadata items based on a current output position in the media item. The electronic device may then generate and output a user interface including a progress bar that includes indicators representing the selected metadata items and output the user interface to a display of the electronic device.

20 Claims, 5 Drawing Sheets

(56) References Cited

U.S. PATENT DOCUMENTS

| | | | | |
|---|---|---|---|---|
| 2012/0151339 A1* | 6/2012 | Zhang | ................... | G06F 3/016 |
| | | | | 715/702 |
| 2013/0212521 A1* | 8/2013 | Fedoseyeva | .......... | G06Q 10/00 |
| | | | | 715/781 |
| 2013/0298021 A1* | 11/2013 | Park | ................... | G06F 3/04847 |
| | | | | 715/716 |
| 2014/0033109 A1* | 1/2014 | Ghorayeb | .............. | G06Q 10/06 |
| | | | | 715/772 |
| 2015/0277732 A1* | 10/2015 | Billgren | ........... | G06F 17/30769 |
| | | | | 715/716 |
| 2015/0301706 A1* | 10/2015 | Logan | .................. | G06F 17/241 |
| | | | | 715/777 |
| 2015/0348379 A1* | 12/2015 | Moussette | ......... | H04N 21/4307 |
| | | | | 340/407.1 |
| 2015/0350803 A1* | 12/2015 | Wyatt | .................... | H04R 3/12 |
| | | | | 381/17 |
| 2016/0018965 A1* | 1/2016 | Park | ..................... | G06F 3/0486 |
| | | | | 715/769 |
| 2016/0253058 A1* | 9/2016 | Chak | .................... | G06F 3/0483 |
| | | | | 715/776 |
| 2016/0378276 A1* | 12/2016 | Shah | .................... | G06F 3/0482 |
| | | | | 715/720 |

\* cited by examiner

NAVIGATING METADATA IN LONG FORM CONTENT

BACKGROUND

Navigating and accessing metadata within content items may be difficult, especially in the case of metadata associated with certain timeframes in long form content, such as audiobooks. Typically, when consuming such media items, a user is unaware of whether any metadata is associated with the content currently being consumed and may have to search manually determine if such metadata exists.

However, while manually searching for metadata related to a media item is possible, it may be difficult to determine what metadata is associated with the portion of the media item currently being consumed. Moreover, repeatedly performing such searches may be time-consuming and frustrating for the user. Worse, the distraction caused by such interruptions may prevent or otherwise impede the user from comprehending the content of the media item itself.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
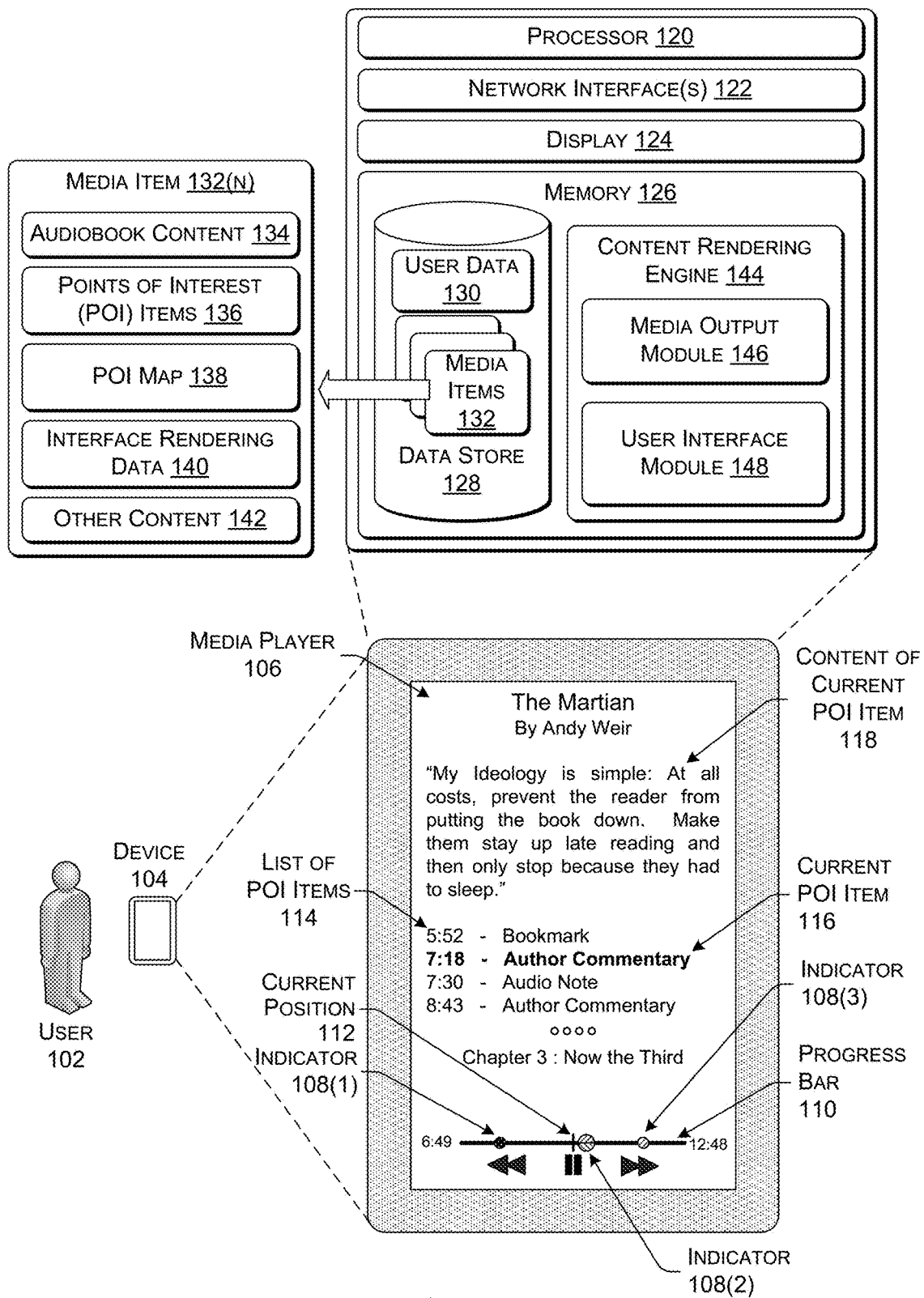
FIG. 1 illustrates an example electronic device that may provide users consuming content with the ability to navigate and access metadata items associated with the content.

This disclosure describes, in part, techniques for providing users consuming content with the ability to navigate and access metadata items associated with the content. For example, the disclosed techniques may allow for navigation and access to metadata items associated with certain positions or ranges (e.g. in time, page, etc.) within the content. Further, this disclosure describes techniques for generating and outputting user interfaces to provide such functionality.

In some implementations, a user interface may be generated to provide visual, auditory, or haptic information to users regarding metadata items (also referred to herein as points of interest (POIs)) associated with content being output to the user. For example, where the user interface includes a progress bar representing time positions within a media item (e.g. time positions in an audiobook or portion thereof), points of interest may be represented visually along the progress bar and auditory and/or haptic cues may be output when the user reaches time positions within the media item associated with point of interests. Moreover, different representations and/or cues may be output for different types of points of interest.

The techniques are described below with reference to particular devices, processes and contexts. However, it is to be appreciated that a number of other devices or processes may also employ these techniques in a variety of other contexts. For example, many of the examples provided below are in the context of audiobooks being presented on touchscreen display devices, such as mobile phones or tablet devices. It is to be appreciated that such examples are illustrative and not limiting on the scope of this disclosure. For example, it would be understood in view of this disclosure that the techniques described below may be applied in the context of audio-visual media items presented on a variety of devices.

Furthermore, as used herein, the terms "media item," "content item," "books," and "audiobooks" may include any type of content which can be stored and distributed in digital form. By way of illustration, and without limitation, the terms "media item," "content item," "books," and "audiobooks" can include all forms of audio and audiovisual works such as music, multimedia presentations, audio books, movies, images, etc., and all forms of textual information such as books, magazines, newspapers, newsletters, periodicals, journals, reference materials, telephone books, textbooks, anthologies, proceedings of meetings, forms, directories, maps, manuals, guides, references, photographs, articles, reports, documents, etc., and the like. Further, as used herein, the terms "media item," "content item," "books," and "audiobooks" are not limited to the entirety of any item and may be a page, a chapter, a section, a set of pages and so on within a textual electronic content item. Similarly, the terms "media item," "content item," "books," and "audiobooks", when used in the context of non-textual items, is not limited to the entirely or any particular portion of any item.

As used herein, the terms "output position," "current time position," "current position," and so on may refer to a position within media content or a range of media content that is currently the focus of output to the user. For example, in the context of an audiobook or movie, the output position may refer to the time position within the audiobook content that is currently being output. In the context of an e-book, the output position may refer to the current page or similar position within e-book.

As used herein, the term "points of interest" may include any type of metadata associated with a position or range in a media item (e.g. a time position in an audiobook). Further, the metadata content of points of interest may include various types of data. For example, metadata content may include bookmarks, notes, author and/or director commentary, highlights, additional media items (e.g. a video of an interview with the author), indicators of critical events in the course of the story and so on.

As used herein, the term "progress bar" is not limited to any particular type of progress bar. For example, a first type of progress bar may represent a portion of the item (or the entirety) from the beginning to end of the portion (e.g. end of a chapter or track) and a position indicator may move across the progress bar as the media item is output. A second type of progress bar may represent a moving time window that moves past a stationary position indicator. This second type of progress bar may include marks that indicated the beginning and end of portions or point in time in the media content. For example, an implementation including the second type of progress bar may maintain a centered position indicator with chapter markings that move relative to the position indicator as the media item is output. Of course, these are just two examples of progress bars and other variations are possible.

FIG. 1 illustrates a user 102 utilizing an electronic device 104 to consume media items via a media player 106 that assists users in locating and accessing points of interest associated with particular time positions in the media items. As illustrated, four points of interest items are represented by three indicators 108(1)-108(3) that appear along the progress bar 110. In particular, the indicated points of interest are points of interest near the current output position 112 within the media item. Indicator 108(1) represents a bookmark POI mapped to a time position of 5:52 of Chapter 3 of the audiobook content. Indicator 108(2) represents two POIs, an author commentary POI mapped to a time position of 7:18 of Chapter 3 of the audiobook content (i.e. the top half of the indicator) and an audio note POI item mapped to a time position of 7:30 of Chapter 3 of the audiobook content (i.e. the bottom half of the indicator). Indicator 108(3) represents an author commentary POI mapped to a time position of 8:43 of Chapter 3 of the audiobook content. In addition, a list of points of interest items 114 is illustrated that includes a currently displayed POI item 116, the contents 118 of which are displayed above the list. Additional information regarding the generation and output of the user interface of the media player 106 is provided below.

FIG. 1 further illustrates example details of an electronic device 104 that may assist users in locating and accessing points of interest associated with particular positions in media items. While FIG. 1 illustrates the electronic device 104 as a tablet device, the device 104 may comprise any sort of device, such as a mobile phone, a multifunctional device, a desktop computer, a laptop computer, a game console, a personal media player, or the like. As illustrated, the device 104 includes one or more processors 120, one or more network interfaces 122, one or more displays 124, and memory 126. The device 104 may also include various additional components, such as one or more input devices that allow the user 102 to operate the device 104, an operating system, system busses, and the like.

The network interface 122 allows the electronic device 104 to communicate with content and metadata providers and other entities over networks, such as local-area networks (LANs), wide-area networks (WANs), the Internet, wireless networks, wireless wide-area networks (WWANs), cable television networks, telephone networks, cellular communications networks, combinations of the foregoing, and/or the like. The display 124, meanwhile, may comprise any sort of display for visually rendering the media player 106 and media items, such as a liquid crystal display (LCD), a light-emitting diode (LED) display, an electronic paper display, or the like. The display 124 may further comprise an input device such as a touchscreen.

The memory 126 (and other memories described herein) stores a number of modules and data, and may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, RAID storage systems, or any other medium which can be used to store the desired information and which can be accessed by a computing device.

As illustrated, the memory 126 stores or otherwise has access to a datastore 128 that stores user data 130 and one or more media items 132(1), ..., 132(N). The datastore 128 may store the media items 132(1)-(N) persistently or temporarily, as in the case where a content provider streams delivery of a media item being rendered the device 104. In either instance, FIG. 1 illustrates that the example media item 132 (N) may include audiobook content 134, one or more POI items 136, a POI map 138, interface rendering data 140, and other content 142 of the media item 132 (e.g., images, videos, etc.). In the illustrated example, the media item 132(N) may be a stored copy of, or otherwise corresponds to, the media item being played by the media player 106 in FIGS. 1-3B. As such, it is to be understood that the audiobook content 134 is shown for ease of explanation and may be another type of media content for other media items 132. For example, media item 132(N−1) (not shown) may be movie-media item and the associated content 134 may be movie content.

In some implementations, the POI items 136 may comprise text, audio, video and/or any other item(s) associated with the audiobook content 134. In some instances, the POI items 136 may comprise content that is configured to be output visually on a display, while in other instances the POI items 136 may comprise content that is configured to be output audibly on one or more speakers of the device 104. For example, in some implementations, the POI items 136 may include audio POI items that are recorded or synthesized spoken versions of content (e.g. a recorded or synthesized spoken version of the content indicated by 118). In addition, the manner in which the POI items 136 are illustrated as being output is merely an example and many other variations are possible.

The POI map 138 may map the POI items 136 to the respective time positions or time ranges of the audiobook content 134. For instance, the POI map 138 may link a particular POI item 136 to a time position of the audiobook content 134 to which it corresponds (e.g., the current POI item 116 may be mapped to a time position of 7:18 of Chapter 3 of the audiobook content, the prior bookmark POI item may be mapped to a time position of 5:52 of Chapter 3 of the audiobook content and the following audio note POI item may be mapped to a time position of 7:30 of Chapter 3 of the audiobook content). Although discussed as mapping to "time positions" in the illustrated examples, implementations are not limited to time mapped POIs. In other types of media items, the POI map may map the POIs to locations in the media item. More particularly, in a eBook media item, the POI map may map the POIs to a position in the text of the eBook rather than a time position.

In some instances, the POI items 136 and POI map 138 may accompany the audiobook content 134 of the media item 132(N). For instance, when a publisher makes the media item 132(N) available for acquisition, the publisher may include the POI items 136 and the POI map 138. In other instances, the device 104 or another entity (e.g., an entity that offers the media item 132(N) for acquisition) may create the POI items 136 and the POI map 138 or obtain the POI map 138 from a third-party source. For instance, a reference source may generate or select POI items which the third-party source has determined to be suitable POI items for one or more time positions or portions of the media content of the media item 132(N). The device 104 or the other entity may then identify the time positions or portions of the media content within the audiobook content 134, obtain the corresponding POI items, store the obtained POI items as POI items 136 and then map the POI items 136 to the audiobook content 134 in the POI map 138. In still other instances, the device 104 or another entity (e.g., the entity that offers the media items for acquisition or the user of the device) may create the POI items for the media content, store the POI items as the POI items 136 and then map the POI items 136 to the audiobook content 134 in the POI map 138 (e.g. consumer or user generated comments). Further, the POI items may be created and mapped to the media content using a combination of these approaches (e.g. the POI items 136 include POI items created and mapped by the publisher of the media content, the entity that offers the media content for acquisition, and one or more consumers).

The interface rendering data 140 may store, for example, indications of how the media content and associated POI items should be presented to the user. In other words, the interface rendering data 140 may be utilized in generating the user interface of the media player 106 for the media items 132 and for the POIs. In some implementations, the interface rendering data 140 may also provide information for rendering the media content and/or associated POI items for different devices or types of devices. For example, an audiobook may be output from a variety of devices or types of devices, each of which may have different components and/or capabilities. In a particular example, a first device may have a color display screen and a second device may have a monochrome display screen. The interface rendering data 140 may include media item specific data on how to render the POI items and the associated user interface elements for devices with the color displays and for devices with monochrome displays. Additional details relating to example presentations of POI items to users are provided with regard to FIGS. 2-3B.

In some instances, the interface rendering data 140 accompanies the audiobook content 134 of the media item 132(N). For instance, when a publisher makes the media item 132(N) available for acquisition, the publisher may include the interface rendering data 140. In still other instances, the device 104 or another entity (e.g., the entity that offers the media item 132(N) for acquisition) may generate, for example, the rendering data for the audiobook content 134 and the media item 132(N) and store the interface rendering data 140. For instance, where the entity offering the media items 132 for acquisition also provides the media player 106 through which the media content 134 and POI items 136 are ultimately presented to users, the entity offering the media items 132 for acquisition may create the interface rendering data 140 specifically tailored to the media player 106. These are merely examples and are not limiting. These and/or different entities could determine these and/or different types of presentations in addition to the specific examples given above.

The memory 126 also stores or has access to a content rendering engine 144, which in turns stores or has access to a media output module 146 and a user interface module 148. The content rendering engine 144 may be a part of the media player or a separate application which provides functionality to the media player. The media output module 146 functions to output media content (e.g. the audiobook content of item 132(N)). The user interface module 148 functions to render a user interface with information associated the media items 132 and the POI items on the display 124 of the device 104 and/or on other output components of the device 104 (e.g., speakers, etc.). In this way, the content rendering engine 144 may present the audiobook content 134 such that the POI items 136 associated with the content 134 are locatable and accessible.

Further, the user interface module 148 functions to accept user inputs and update the user interface and/or instruct the media output module 146 to alter the output of the media content. For example, the user interface module 148 may also operate to cause the media output module 146 to insert cues into the output stream. For example, the user interface module 148 may determine that a point of interest has been reached in the playback of the audiobook content 134 and, in response, instruct the media output module 146 to insert an audio cue into audio being output. Alternatively or additionally, the user interface module 148 may directly cause the output of cues to the user 102. For example, the user interface module 148 may cause a haptic feedback component of the device 104 to vibrate the device 104. As such, a user 102 consuming an audiobook, who may not be looking at the display of the device 104, may be informed of the presence of a point of interest related to the portion of the audiobook content currently being output.

Aspects of the cues may vary from implementation to implementation. In one example variation, cues may correspond to one or more POIs. For example, the user may not wish to hear more than one audio cue per minute (or other period of time). As such, the user interface module 148 may output a combined audio cue for POIs that are within a one minute time period. The user interface module 148 may generate the cues to be distinct for different numbers of POIs or for different types of POIs. For example, an audio cue corresponding to two POIs may be louder and/or longer than an audio cue corresponding to a single POI. Similar types of variations may be applied to different types of cues and/or POIs.

Further, the user interface module 148 may alter the output of the user interface based on input from the user and/or data stored in the user data 130. For example, the user interface module 148 may filter the POI items based on criteria provided by the user. In a more particular example, the user data 130 may indicate that points of interest based on comments of other users should be limited to users that meet some criteria, such as social contacts of the user 102, other user designated by the user 102, other users whose POIs receive positive feedback, and so on. In another example, the user data 130 may indicate which of one or more types of points of interest should or should not be included (e.g., a user may not wish to see highlighting POIs from other users, bookmark POIs, etc.). Further, the user interface module 148 may operate to implement aesthetic preferences of the users based on user input or user data 130. For example, the user data 130 may define colors to be associated with types of POIs (e.g. the color of the indicators 108).

The user interface module 148 may provide a variety of functions to allow for the user to navigate and access POI items while consuming the media content. Some nonlimiting examples of such functions have been provided above. Additional examples and details are set forth below.

For example, the user interface module 148 may operate to render POIs indicators 108 along the progress bar 110. The POI indicators 108 may be rendered to allow for the user to distinguish between indicators representing different types of POIs and between indicators representing different numbers of POIs. In the illustrated examples of FIGS. 1-3B, the size of the indicators 108 represents or corresponds to the number of POIs represented by the indicator and different types of crosshatching are applied to indicators to indicate the type of the POI. In the case of an indicator representing multiple POIs, portions of indicators are given different crosshatching to represent the different types of POIs represented. Of course, implementations are not limited to this example. For example, in some implementations, colors or other visual characteristics may be utilized instead of crosshatching to indicate the type of POI. Similarly, in some implementations, icons may be shown for the type of the POI (e.g. above or within the indicator). In addition, rather than subdividing the indicator as illustrated in FIGS. 1-3B, in some implementations, an indicator representing multiple POIs may be rendered as a cluster of concentric circles or other shapes, each representing a POI and rendered with the associated POI's visual characteristics (e.g. color, cross-hatching, etc.). Moreover, in some implementations, an indicator that represents more POIs than can be represented by the indicator in detail may have a particular visual characteristic. For example, an indicator representing a large number of POIs may be beyond an allowable size. In such a case, the indicator may be rendered smaller, but with a distinguishing characteristic, such a bolding of the indicator's bordering.

Another example function described above to assist users in navigating and accessing points of interests is the rendering of a list of POI items 114. As shown in FIGS. 1-3B, the list of POI items 114 indicates a position in the content associated with the POI item and the type of the POI item (e.g. bookmark, author commentary, audio note, etc.). However, the implementations are not limited to the illustrated examples. For example, in some implementations, the user interface module 148 may not include a list of POI items 114. In other implementations, the list of POI items may be rendered differently or have additional or less information. In a particular example implementation, the list of POI items 114 may include icons representing the type of POI item in addition or in the alternative to the textual identification of the type of POI item shown in FIGS. 1-3B.

Additional discussion of user interface functionality of the user interface module 148 is provided below with regard to FIGS. 2-3B.

While FIG. 1 illustrates one example device, it is to be appreciated that multiple other devices and architectures may implement the described techniques. For instance, the components illustrated as being located on or accessible to the device 104 may be located in any other location, such as on one or more of servers that are accessible to the device over a network, spread out amongst servers, located on other electronic devices, and/or the like.

Figure 2:
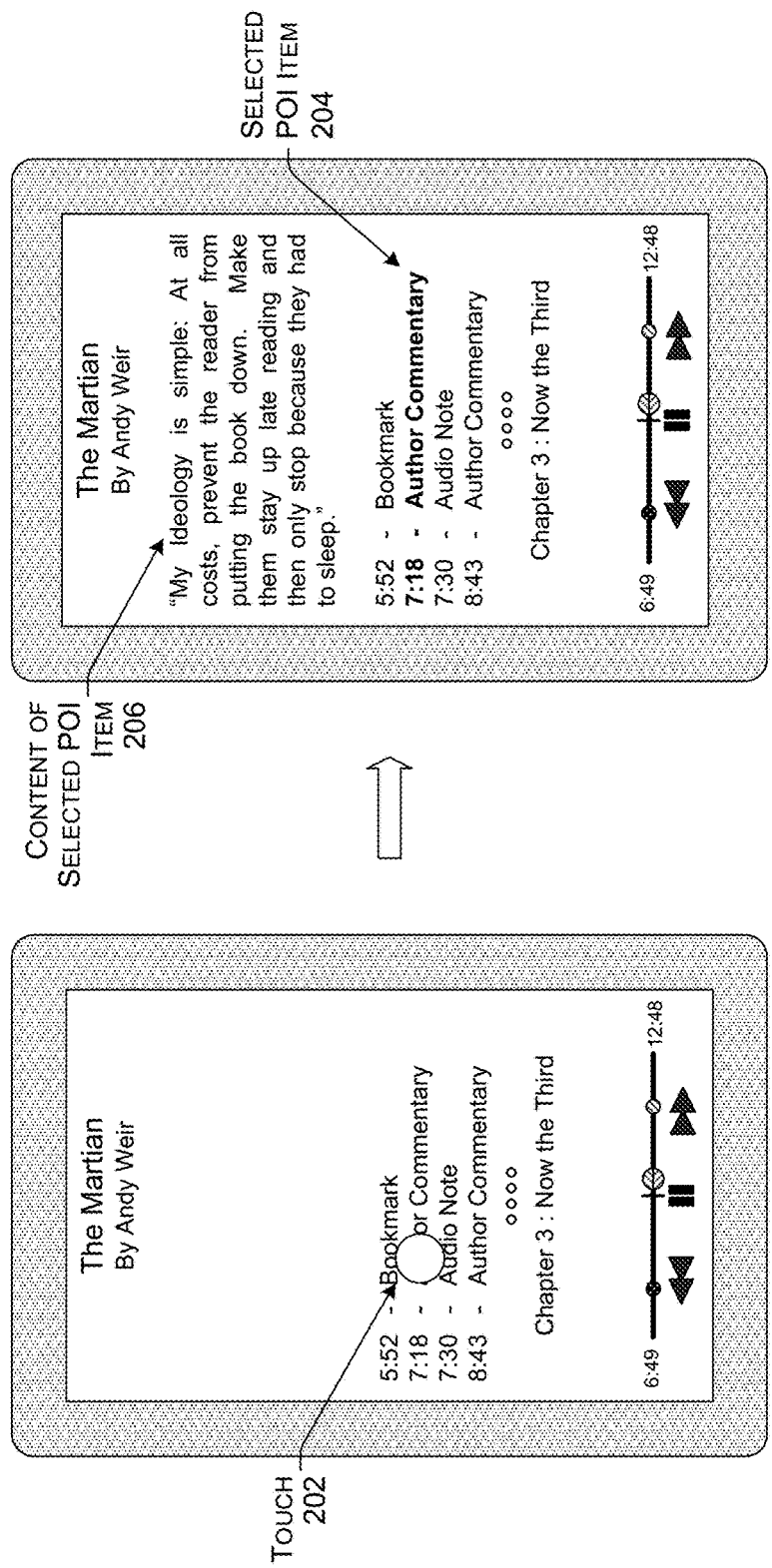
FIG. 2 illustrates an example of the operation of an electronic device in which the user selects a metadata item while consuming content.

FIG. 2 illustrates an example operation 200 of the electronic device 104, and particularly, the user interface module 148. More particularly, FIG. 2 illustrates an example functionality where the user selects a displayed POI while consuming content. In particular, in the illustrated implementation, the items shown in the list of POI items 114 may be selectable by the user to trigger the output of the associated POI item (e.g. as part of the user interface or through another type of device).

Initially, the user interface is displayed with a progress bar and a list of points of interest without a selected POI. Subsequently, a touch input 202 is detected that selects the author commentary POI associated with the time position of 7:18. In response, the user interface module 148 updates the user interface to show the selection of the selected POI item 204 (e.g., by bolding the text of the item 204 in the displayed list). The user interface module 148 also updates the user interface to include the content of the selected POI item 206. Though the illustrated example bolds the text of the list item 204 to indicate the selected/current POI item, implementations are not so limited. For example, in other implementations, the current POI item may be indicated by placing a box around the item in the list.

In some implementations, the user interface module 148 may automatically update the user interface to change the selected POI and/or to include content of a different POI item. For example, the update illustrated FIG. 2 may be performed automatically when the playback of the content of the audiobook reaches the time position of 7:18. Further, as discussed above, in some implementations, the user interface module 148 may also output a cue to notify a user that a time position related to a point of interest has been reached. For example, the user interface module 148 may cause the media output module 146 to inject an auditory queue into the playback of the audiobook and cause the device 104 to vibrate.

Numerous variations on the functionality shown in, and described with regard to, FIG. 2 would be apparent in view disclosure. For example, in some implementations, the user interface may not include a list of POI items. In some such implementations, the user interface may allow for selection of POI items by touching the corresponding indicator shown on the progress bar. In other implementations, the progress bar may not include the indicators or may include a different form of indicator.

Figure 3A:
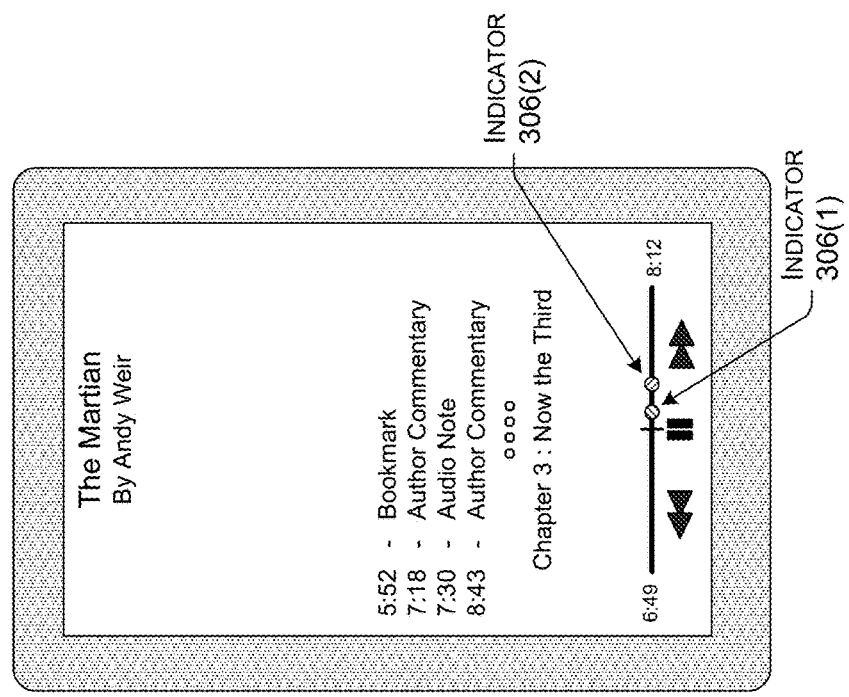
FIGS. 3A and 3B illustrate example operations of an electronic device to allow a user consuming media content to obtain additional detail regarding points of interest using a progress bar.
Figure 3A:
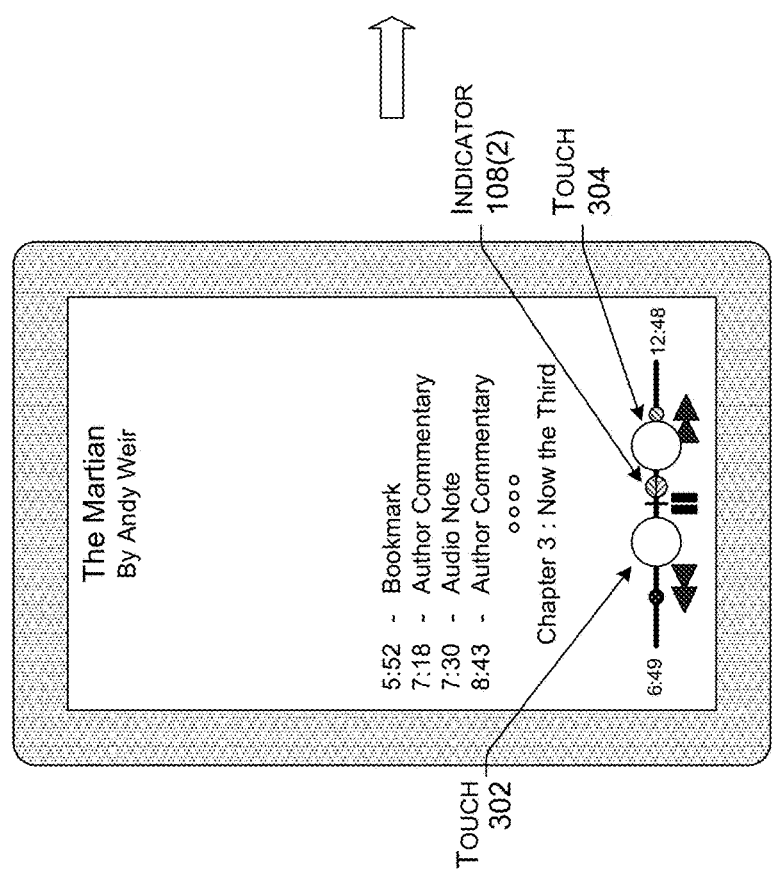
Figure 3B:
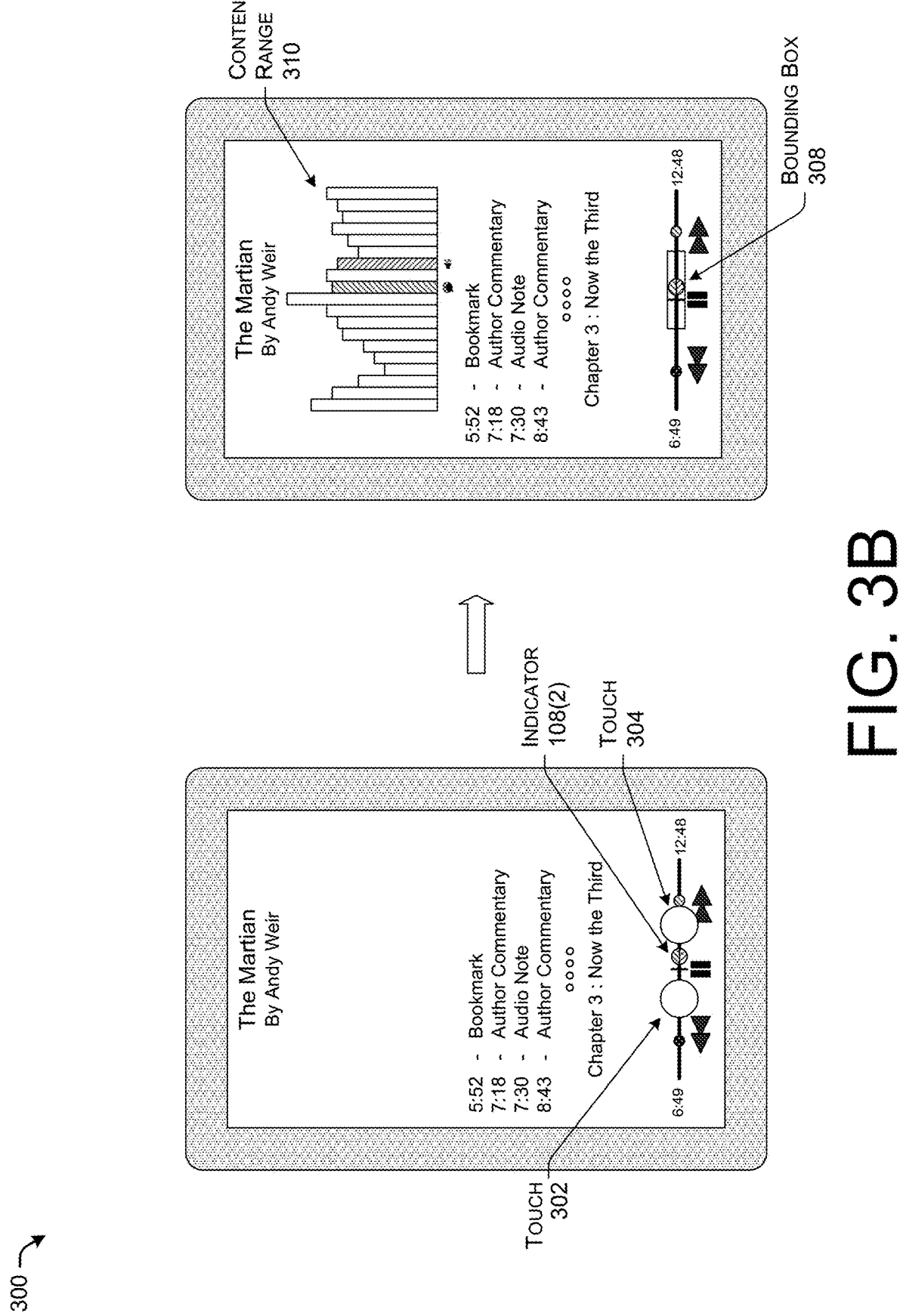

FIGS. 3A and 3B illustrate additional example operations 300 of the electronic device 104, and particularly, the user interface module 148. More particularly, FIGS. 3A and 3B illustrate two example implementations of the functionality that allows the user consuming media content to obtain additional detail regarding POIs using the progress bar.

In both FIGS. 3A and 3B, the user interface initially shows indicators set along a progress bar that represent four POIs. For ease of explanation, assume a user wishes to receive a more detailed view of the time range including the first audio commentary POI and the audio note POI. To do so, the user touches the progress bar on either side of the indicator 108(2) (i.e. at touch 302 and touch 304).

In FIG. 3A, the user interface module 148 responds by "zooming" the progress bar in on the time range between the touches 302 and 304. As a result, the time positions associated with the two POIs corresponding to the indicator 108(2) are no longer close enough on the progress bar to share a combined indicator. In other words, because the scale of the progress bar has decreased, the user interface module 148 renders separate indicators for the points of interest. This is illustrated in FIG. 3A by rendering the user interface to include indicators 306(1) and 306(2).

The determination of whether a combined indicator should be used may vary from implementation to implementation and may also vary based on user preferences. For example, in some implementations, the determination of whether a combined indicator should be used may determine whether the times associated with the points of interest in question are within a threshold distance of each other or whether, if rendered with separate indicators, the separate indicators would overlap in the user interface. In other implementations, the determination may be based on the current scale of the progress bar, the distance between the positions associated with points of interest, whether the POIs in question are related, and so on.

The example implementation illustrated in FIG. 3B responds to the touches 302 and 304 in a different manner. In particular, the user interface module 148 updates the user interface include a bounding box 308 that encompasses the range selected by the touches 302 and 304. The user interface module 148 also update user interface to include a visual representation of the selected content range 310 above the list of POI items 114. The illustrated visual representation is illustrated as a modified dynamic range visualization. In general, dynamic range visualization illustrates columns that represent sound energy being output at respective frequencies ranges. The illustrated modified dynamic range visualization also represents the time range encompassed by the bounding box. In other words, each column also represents a portion of the bound time range and, whether a point of interest appears in that portion of the bound time range. In particular, the modified dynamic range visualization includes two columns which are rendered to indicate that points of interest occur during the corresponding time period. In the illustrated example, the columns are rendered to have visual characteristics similar to the progress bar indicators associated with the same points of interest and icons representing the type of points of interest are included below the columns.

It is to be appreciated that the examples provided above are illustrative and not limiting on the scope of this disclosure. For example, it would be understood in view of this disclosure that the techniques described below may be applied with a wide variety of visualizations, not merely the particular example visualizations discussed herein.

Figure 4:
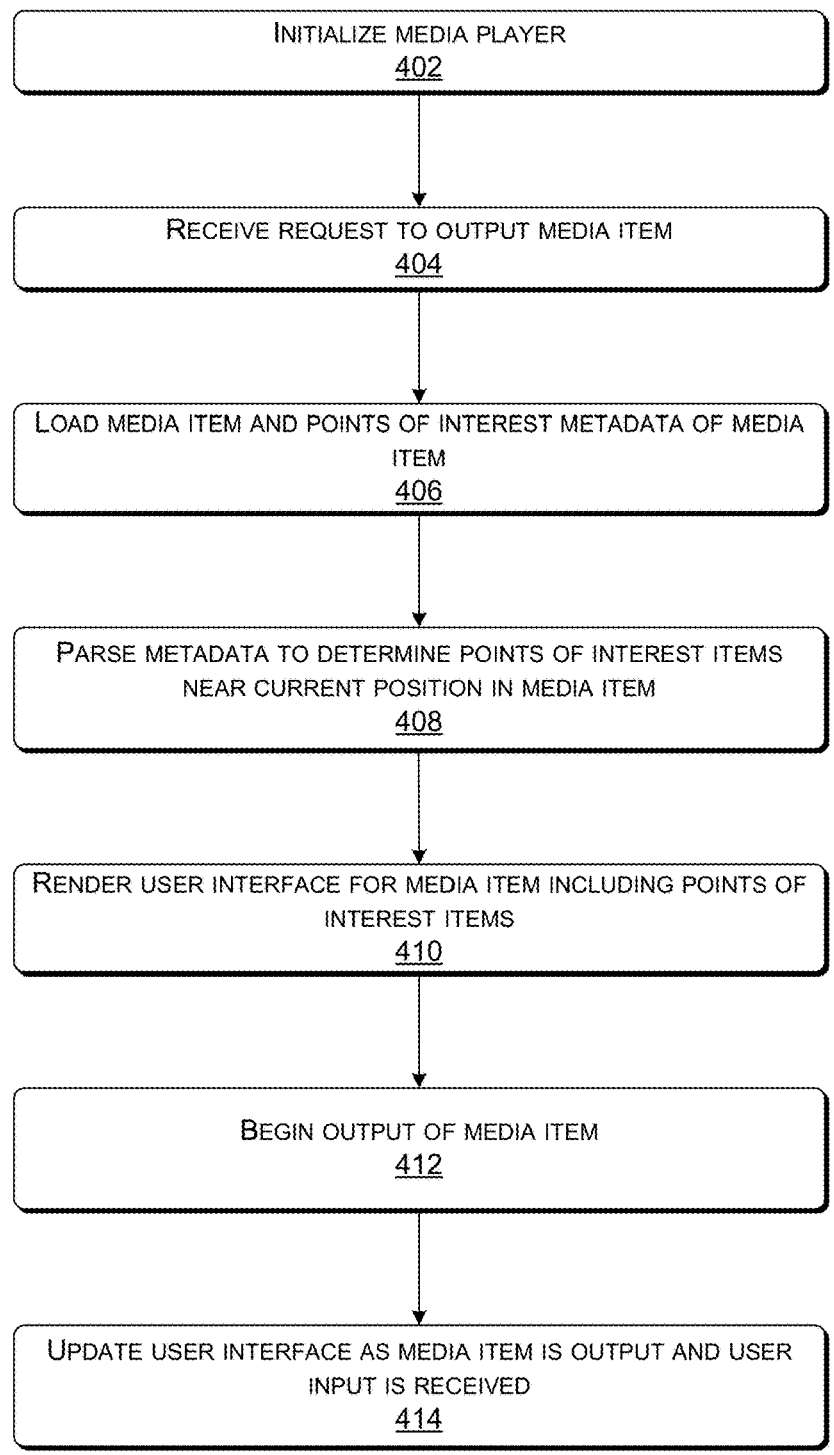
FIG. 4 illustrates an illustrative process for providing users consuming content with the ability to navigate and access metadata items associated with the content.

FIG. 4 illustrates an example flow diagram 400 for providing assistance to users in locating and accessing points of interest associated with particular time positions in the media items using the techniques described herein. This process (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

At 402, an electronic device, such as a device 104, initializes a media player. For example, an input may be received requesting a media player application be executed and the electronic device may execute the media player.

At 404, the device 104 may receive a request to output a media item. In turn, at 406, the device 104 may load the media item and related points of interest metadata of the media item from a local or remote data store.

At 408, the device 104 may parse the metadata to determine points of interest items near a current playback position in the media item. Based on this information, as well as user preference data and/or the interface rendering data, the device 104 may select one or more POIs to include in the user interface of the media player.

At 410, the device 104 may render a user interface of the media player for the media item including points of interest information. Such a user interface may be generated in the manner described above with regard to FIGS. 1-3B, particularly with reference to the user interface module 148. At 412, the device 104 may begin output of the media item from the playback position.

Subsequently, at 414, the device 104 may update the user interface of the media player as the media item is output and/or user input is received. The updating operation may be performed in the manner described above with regard to FIGS. 1-3B, particularly with reference to the user interface module 148.

The blocks 402-414 are not intended to be limit implementations nor intended to imply that the operations described blocks are unitary and/or encapsulated within the steps or in a particular order. In other words, in various implementations the blocks 402-414 may be reordered, combined divided and so on. Moreover, as alluded to above, the details of the procedure for providing assistance to users in locating and accessing points of interest associated with particular time positions in the media items may vary from implementation to implementation.

The examples provided above are not limiting and many variations are possible. In some implementations the techniques described herein may be utilized with other techniques and in different contexts. For example, the techniques disclosed herein may be combined with biometric feedback data to provide biometric triggers for points of interest. More particularly, biometric feedback may be collected to determine user interest in the current portion of the media items and, should the biometric feedback indicate the user is interested, points of interest may be shown and audio cues may be output to provide additional information regarding the current portion of the media item. In other implementations, biometric feedback be utilized to determine critical events or dramatic portions of media items by determining the state of users. This information may then be utilized map point of interest data to the media content.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
one or more processors;
a display; and
memory, storing instructions that, when executed on the one or more processors, cause the one or more processors to perform acts comprising:
receiving a request to play an audiobook from a specified time position in the audiobook, wherein the audiobook is associated with a plurality of metadata items that are mapped to respective time positions within the audiobook;
determining, based at least in part on a proximity of the specified time position to the respective time positions to which the plurality of metadata items are mapped, a first proximate metadata item of the plurality of metadata items and a second proximate metadata item of the plurality of metadata items to send to the display;
determining that the first proximate metadata item is a first type of metadata item;
determining that the second proximate metadata item is a second type of metadata item;
generating user interface data including a progress bar that includes a first indicator representing the first proximate metadata item and a second indicator representing the second proximate metadata item, wherein generating the user interface data includes:
generating first user interface data corresponding to the first indicator such that the first indicator is to be displayed with a first color based at least in part on the first indicator being of the first type of metadata item; and
generating second user interface data corresponding to the second indicator such that the second indicator is to be displayed with a second color based at least in part on the second indicator being of the second type of metadata items;

sending the user interface data to the display;

receiving an input specifying a portion of the progress bar including the first indicator;

generating updated user interface data including an expanded view of the specified portion of the progress bar including an expanded indicator representing the first proximate metadata item;

outputting an audio cue associated with the first indicator based at least in part on the input specifying the portion of the progress bar including the first indicator and a number of audio cues that have been output during a preceding period of time, the audio cue different than the first proximate metadata item; and sending the updated user interface data to the display.

2. A system as recited in claim 1, wherein the memory stores additional instructions that, when executed on the one or more processors, cause the one or more processors to perform additional acts comprising:

determining that a current output position from which the audiobook is being output is the same as or within a range of a particular respective time position mapped to a particular metadata item of the plurality of metadata items;

in response to determining that the current output position from which content of the audiobook is being output is the same as or within a range of a particular respective time position:

adding an audio cue to audio output of the audiobook to indicate that the current output position is the same as or within the range of the particular respective time position associated with the particular metadata item;

automatically generating additional updated user interface data that includes content of the particular metadata item; and sending the additional updated user interface data to the display.

3. A system as recited in claim 1, wherein the memory stores additional instructions that, when executed on the one or more processors, cause the one or more processors to perform additional acts comprising:

determining, based at least in part on a proximity of a current output position from which the audiobook is being output to the respective time positions to which the plurality of metadata items are mapped, a third proximate metadata item of the plurality of metadata items and a fourth proximate metadata item of the plurality of metadata items, wherein the third proximate metadata item is mapped to a third respective position of the respective positions and the fourth proximate metadata item is mapped to a fourth respective position of the respective positions;

determining a proximity of the third respective position and the fourth respective position;

generating first additional user interface data corresponding to a third indicator representing the first proximate metadata item and the second proximate metadata item based at least in part on a proximity of the third respective position and the fourth respective position;

sending the first additional user interface data to the display;

receiving an input to zoom the progress bar such that a range within the audiobook represented by the progress bar is reduced from a first range to a second range;

in response to the input, a fourth indicator representing the third proximate metadata item and a fifth indicator representing the fourth proximate metadata item based at least in part on the proximity of the third respective position and the fourth respective position and the second range; and sending the updated user interface to the display.

4. A method comprising:

under control of an electronic device that is configured with executable instructions, receiving a media item from a first source;

receiving one or more metadata items associated with the media item from a second source different than the first source, the one or more metadata items including a first metadata item and a second metadata item;

receiving point of interest data from the second source, the point of interest data indicating a first position of the first metadata item with respect to the media item and a second position of the second metadata item with respect to the media item;

receiving a request to output a media item;

outputting content of the media item from a current position within the media item;

determining that the first position associated with the first metadata item and the second position associated with the second metadata item are proximate to a current position within the media item;

determining the first metadata item is a first type of metadata item;

determining the second metadata item is a second type of metadata item;

generating user interface data including a progress bar that includes one or more indicators representing the one or more metadata items, wherein one or more first indicators of the one or more indicators representing the first type of metadata item have a first visual characteristic and one or more second indicators of the one or more indicators representing the second type of metadata item have a second visual characteristic that is distinct from the first visual characteristic, and wherein the first visual characteristic and the second visual characteristic are selected based at least in part on the type of metadata items and user preference data;

generating an expanded view of a specified portion of the progress bar including an expanded indicator representing the first metadata item;

outputting an audio cue associated with the first indicator based at least in part on the specified portion of the progress bar including the first indicator and a number of audio cues that have been output during a preceding period of time, the audio cue different than the first metadata item; and sending the user interface data and the expanded view to a display of the electronic device.

5. A method as recited in claim 4, wherein outputting the audio cue indicates that the current position is the same as or within the range of the particular respective position associated with the first metadata item.

6. A method as recited in claim 4, further comprising:

determining that the current position within the media item from which content of the media item is being output is the same as or within a particular respective range of a position associated with a the first metadata item;

generating updated user interface data including content of the first metadata item; and sending the updated user interface data to the display of the electronic device.

7. A method as recited in claim 4, wherein generating first user interface data corresponding to a first indicator representing the first metadata item and the second metadata item based at least in part on a proximity of the first respective position and the second respective position.

8. A method as recited in claim 7, further comprising:
receiving an input to zoom the progress bar such that a range within the content of the media item represented by the progress bar is reduced from a first range to a second range prior to generating the expanded view.

9. A method as recited in claim 8, wherein the one or more metadata items includes a third metadata item and the one or more first indicators correspond to the first metadata item and the third metadata item and the one or more second indicators correspond to the second metadata item.

10. A method as recited in claim 4, wherein the first metadata item is associated with a first respective position of the respective positions and the second metadata item is associated with a second respective position of the respective positions and wherein generating the user interface includes:
generating, based at least in part on a proximity of the first respective position and the second respective position, first user interface data corresponding to a first indicator representing the first metadata item and to a second indicator representing the second metadata item;
the method further comprising:
receiving an input to change a zoom of the progress bar such that a range within the media item represented by the progress bar is increased from a first range to a second range and wherein generating the expanded view is in response to the input and based at least in part on the proximity of the first respective position and the second respective position and the second range, second user interface data corresponding to a third indicator representing the first metadata item and the second metadata item.

11. A method as recited in claim 10, further comprising:
wherein generating the first user interface data includes:
generating a first portion of the first user interface data corresponding to the first indicator such that the first indicator is to be displayed with a first visual characteristic based at least in part on the first indicator being of the first type of metadata item; and
generating a second portion of the first user interface data corresponding to the second indicator such that the second indicator is to be displayed with a second visual characteristic that is distinct from the first visual characteristic based at least in part on the second indicator being of the second type of metadata item; and
wherein the generating of the second user interface data includes:
generating the third indicator such that the second indicator is to be displayed with a third visual characteristic that is based on the first visual characteristic and the second visual characteristic.

12. A method as recited in claim 4, wherein generating the expanded view includes an expanded indicator representing the first metadata item.

13. A method as recited in claim 4, wherein the positions of the first metadata item and the second metadata item are time positions.

14. A method as recited in claim 4, further comprising receiving a interface rendering data associated with the first metadata item and the second metadata item from the second source.

15. A system comprising:
one or more processors;
a display; and
memory, storing instructions that, when executed on the one or more processors, cause the one or more processors to perform acts comprising:
receiving a request to output a media item, the media item associated with a plurality of metadata items, individual metadata items of the plurality of metadata items having a position within the media item and interface rendering data to assist with displaying the individual metadata item on different types of devices;
outputting content of the media item from a current position within the media item;
determining that the current position is within a range of a first position associated with a first metadata item of a plurality of metadata items;
determining that the current position is outside a range of a second position associated with a second metadata item of the plurality of metadata items;
determining that the first metadata item is a first type of metadata item;
determining that the second metadata item is a second type of metadata item;
generating, based at least in part on the interface rendering data associated with the first metadata item and the second metadata item, user interface data that includes a first indicator representing the first type of metadata item and having a first visual characteristic, a second indicator representing the second type of metadata item and having a second visual characteristic that is distinct from the first visual characteristic, and an audio cue to indicate that the current position is within the range of the first position associated with the first metadata item, the audio cue different than the first metadata item; and
sending the user interface data to the display.

16. A system as recited in claim 15, wherein the memory stores additional instructions that, when executed on the one or more processors, cause the one or more processors to perform additional acts comprising:
receiving an input selecting a particular metadata item of the one or more metadata items;
generating updated user interface data including content of the particular metadata item; and
sending the updated user interface data to the display.

17. A system as recited in claim 15, wherein the first visual characteristic is based at least in part on the current position being within the range of the first metadata item.

18. A system as recited in claim 15, wherein the indicators are displayed in the user interface along a progress bar.

19. A system as recited in claim 18, wherein the memory stores additional instructions that, when executed on the one or more processors, cause the one or more processors to perform additional acts comprising:
receiving an input specifying a portion of the progress bar including the first indicator;
generating updated user interface data including an expanded view of the specified portion of the progress bar including an expanded indicator representing the first metadata item and a dynamic range visualization of sound energy binge being output at respective frequency ranges associated with the content of the portion of the progress bar; and
sending the updated user interface data to the display.

20. A system as recited in claim 18, wherein the first metadata item is associated with a first respective position of the respective positions and the second metadata item is associated with a second respective position of the respective positions and wherein generating the user interface data includes:
   generating first user interface data corresponding to a first indicator representing the first metadata item and the second metadata item based at least in part on a proximity of the first respective position and the second respective position.

* * * * *

UNITED STATES PATENT AND TRADEMARK OFFICE
CERTIFICATE OF CORRECTION

PATENT NO. : 10,564,924 B1
APPLICATION NO. : 14/870646
DATED : February 18, 2020
INVENTOR(S) : Timothy Jaeger et al.

Page 1 of 1

It is certified that error appears in the above-identified patent and that said Letters Patent is hereby corrected as shown below:

In the Claims

Column 14, Line 61, after "energy" delete --binge--

Signed and Sealed this
Twenty-fourth Day of March, 2020

Andrei Iancu
*Director of the United States Patent and Trademark Office*